(12) United States Patent
Tamaki et al.

(10) Patent No.: US 10,862,102 B2
(45) Date of Patent: Dec. 8, 2020

(54) ELECTRODES WITH ACTIVE MATERIALS IN SHELLS

(71) Applicant: Quallion LLC, Sylmar, CA (US)

(72) Inventors: Ryo Tamaki, Santa Clarita, CA (US); Hiroshi Nakahara, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 0 days.

(21) Appl. No.: 15/690,262

(22) Filed: Aug. 29, 2017

(65) Prior Publication Data

US 2019/0067678 A1 Feb. 28, 2019

(51) Int. Cl.

| | |
|---|---|
| *H01M 4/133* | (2010.01) |
| *H01M 10/052* | (2010.01) |
| *H01M 4/583* | (2010.01) |
| *H01M 4/36* | (2006.01) |
| *H01M 4/62* | (2006.01) |
| *H01M 4/38* | (2006.01) |
| *H01M 4/02* | (2006.01) |
| *H01M 10/0565* | (2010.01) |

(52) U.S. Cl.
CPC ........... *H01M 4/133* (2013.01); *H01M 4/364* (2013.01); *H01M 4/366* (2013.01); *H01M 4/386* (2013.01); *H01M 4/583* (2013.01); *H01M 4/625* (2013.01); *H01M 10/052* (2013.01); *H01M 10/0565* (2013.01); *H01M 2004/021* (2013.01); *H01M 2004/027* (2013.01)

(58) Field of Classification Search
CPC combination set(s) only.
See application file for complete search history.

(56) References Cited

U.S. PATENT DOCUMENTS

| | | | | |
|---|---|---|---|---|
| 2013/0344416 | A1* | 12/2013 | Sakamoto | H01M 10/052 429/495 |
| 2016/0149207 | A1* | 5/2016 | Lahlouh | H01M 4/366 429/213 |
| 2018/0287142 | A1* | 10/2018 | Zhamu | H01M 4/366 |

* cited by examiner

*Primary Examiner* — Kaity V Chandler
(74) *Attorney, Agent, or Firm* — Gavrilovich, Dodd & Lindsey, LLP (57) ABSTRACT

A battery has an electrode with a layer of an active medium. The layer of active medium includes multiple active particles. Each active particle includes a shell that encloses one or more cores. Each of the cores includes one or more active materials. The battery is constructed such to have a State of Charge (SOC) that is greater than 0% before the initial operation (discharge or charge) of the battery.

20 Claims, 3 Drawing Sheets

| Battery | Energy Density (Wh/kg) | Cycle Score | Battery Performance |
|---|---|---|---|
| First | 145 | 5 | 723 |
| Second | 196 | 4 | 786 |
| Third | 260 | 3 | 781 |
| Fourth | 256 | 1 | 256 |
| Fifth | 181 | 1 | 181 |
| Sixth | 155 | 2 | 311 |
| Seventh | 155 | 2 | 310 |
| Eighth | 317 | 3 | 951 |
| Ninth | 312 | 4 | 1247 |

Figure 9

ELECTRODES WITH ACTIVE MATERIALS IN SHELLS

FIELD

The present invention relates to electrochemical devices, and more particularly to the electrodes of electrochemical devices.

BACKGROUND

Metallic silicon is a desirable active material for the anodes of rechargeable batteries because of its high theoretical capacity. For instance, silicon has a theoretical capacity of 4200 mAh/g while the commonly used alternative graphite has a theoretical capacity of only 372 mAh/g. However, during charging of a battery, the silicon in an anode can experience unusually large volume change. For instance, the volume of the silicon can change as much as 200% during charging of a battery. This change in size disrupts the structure of the Solid Electrolyte Interface (SEI) that forms on the anode. Since the Solid Electrolyte Interface (SEI) passivates the anode and prevents reaction between the silicon and the electrolyte, disruption of the Solid Electrolyte Interface (SEI) reduces the cycling performance of the battery. This issue has hindered the adoption of these batteries in commercial applications.

SUMMARY

A battery has an electrode with a layer of an active medium. The layer of active medium includes multiple active particles. Each active particle includes a shell that encloses one or more cores. Each of the cores includes one or more active materials. The battery is constructed such to have a State of Charge (SOC) that is greater than 0% before the initial operation of the battery (initial charge without prior discharge or initial discharge without prior charge).

The battery can be configured such that a cation travels between a positive electrode and a negative electrode during operation of the battery. The one or more active materials include a reduced form of the cation before the initial charge of the battery.

In some instances, at least a portion of the active particles have a core with a volume before the initial charge of the battery that is less than 90% of the volume of the core at a 100% state of charge and that is more than 110% of the volume of the core at a 0% state of charge.

BRIEF DESCRIPTION OF THE FIGURES

FIG. 1A and FIG. 1B illustrate a positive electrode of a battery.

FIG. 2A and FIG. 2B illustrate a negative electrode.

DESCRIPTION

A battery includes one or more electrodes that each has a shell that encloses an active material such as silicon. During the operation of the battery, the active material changes size while the shell retains its size. A Solid Electrolyte Interface (SEI) can form on the shell. Since the shell retains its size, the change in size of the active material during operation of the battery does not substantially stress the Solid Electrolyte Interface (SEI). However, the inventors have found that when the battery is fabricated with a 0% State of Charge (SOC), the active material can rupture the shell during the initial charge. By fabricating the battery at an elevated State of Charge (SOC), the inventors have found that these ruptures can be reduced or even eliminated.

Figures 1A, 1B:
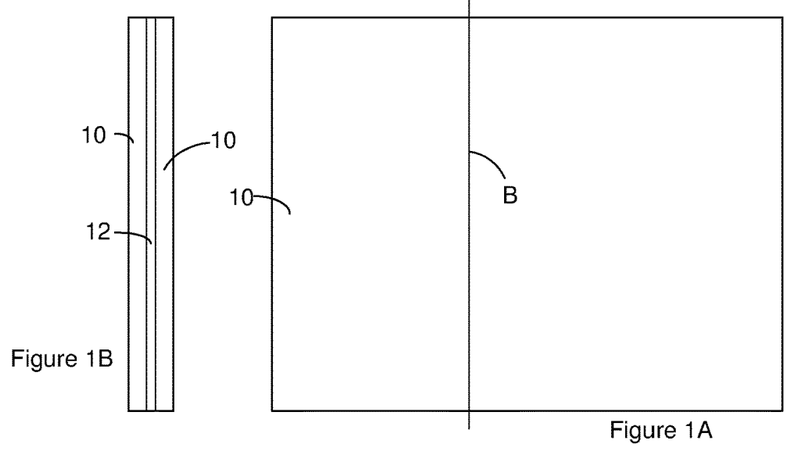
FIG. 1A is a sideview of the positive electrode.
FIG. 1B is a cross section of the positive electrode taken along the line labeled B in FIG. 1A.

FIG. 1A and FIG. 1B illustrate a positive electrode of a battery. FIG. 1A is a sideview of the positive electrode. FIG. 1B is a cross section of the positive electrode taken along the line labeled B in FIG. 1A. The positive electrode includes a positive active medium 10 on both faces of a positive current collector 12. The positive active medium 10 includes or consists of one or more positive active materials. The positive current collector 12 is configured to provide an electrical pathway between the positive active medium 10 and the terminals of an electrochemical device. Although the positive active medium 10 is shown positioned on both faces of the positive current collector 12, the positive active medium 10 can be positioned on only one face of the positive current collector 12.

Suitable positive current collectors 12 include, but are not limited to, aluminum, stainless steel, titanium, or nickel substrates. The positive current collector 12 can be a foil, net, mesh, or plate.

The positive active medium 10 can include or consist of one or more positive active materials. The one or more positive active materials can include or consist of lithiated positive active materials. Suitable lithiated positive active materials include, but are not limited to, lithium nickel cobalt aluminum oxide (NCA), lithium manganese oxide (LMO), lithium manganese nickel cobalt oxide (NMC), lithium ion phosphate (LFP), and other lithium transition metal oxides that also include one or more halogens (halo-lithium transition metal oxide). Suitable halo-lithium transition metal oxides include one or more transition metals included in a group consisting of Mn, Ni, Co, Fe, Cr, Cu. In one example, the halo-lithium transition metal oxides include Mn, Ni, Co and excludes other transition metals. The halogen in the halo-lithium transition metal oxides can include or consist of fluorine. For instance, a suitable halo-lithium transition metal can include fluorine can exclude other halogens or can include one or more other halogens. An example of the halo-lithium transition metal oxide is $Li_{1.2}Ni_{0.2}Co_{0.1}Mn_{0.5}O_2F_{.1}$ or $Li_{1.2}Ni_{0.175}Co_{0.1}Mn_{0.53}O_{1.95}F_{0.05}$. In some instances, the one or more positive active materials can include or consist of non-lithiated positive active materials. Suitable non-lithiated positive active materials include, but are not limited to, vanadium pentaoxide ($V_2O_5$), iron selenide ($FeSe_2$), iron sulfide ($FeS_2$), cobalt sulfide, sulfur, cobalt oxide, manganese oxide and manganese nickel cobalt oxide, nickel manganese aluminum oxide and iron phosphate. In some instances, the one or more positive active materials include a combination of one or more lithiated positive active materials and one or more non-lithiated positive active materials.

The positive medium can optionally include binders, conductors and/or diluents such as PVDF, graphite and acetylene black in addition to the one or more positive active materials. Suitable binders include, but are not limited to, PVDF, powdered fluoropolymer, powdered polytetrafluoroethylene or powdered PVDF. Suitable conductors and/or diluents include, but are not limited to, acetylene black, carbon black and/or graphite or metallic powders such as powdered nickel, aluminum, titanium and stainless steel.

The positive electrode or cathode can be generated by forming a slurry that includes the components of the positive medium and a solvent. The slurry is coated on one side the positive current collector 12 or on both sides of the positive current collector 12. The solvent can then be evaporated from the slurry so as to leave the positive medium on the current collector. The positive electrode can be cut out of the result.

Figure 2A:
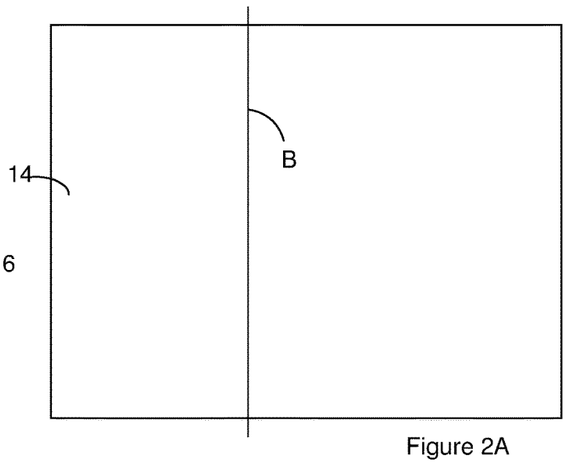
FIG. 2A is a sideview of the negative electrode.
Figure 2B:
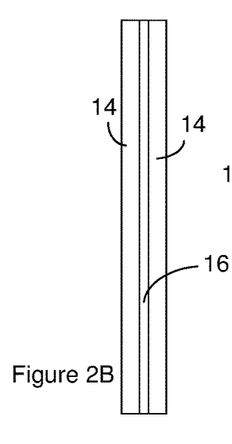
FIG. 2B is a cross section of the negative electrode taken along the line labeled B in FIG. 2A.

FIG. 2A and FIG. 2B illustrate a negative electrode. FIG. 2A is a sideview of the negative electrode. FIG. 2B is a cross section of the negative electrode taken along the line labeled B in FIG. 2A. The negative electrode includes a negative active medium 14 on both faces of a negative current collector 16. The negative active medium 14 includes one or more negative active materials. The negative current collector 16 provides an electrical pathway between the negative active medium 14 and a terminal of an electrochemical device. Although the negative active medium 14 is shown positioned on both faces of the negative current collector 16, the negative active medium 14 can be positioned on only one face of the negative current collector 16.

Suitable negative current collectors 16 include, but are not limited to, titanium, a titanium alloy, stainless steel, nickel, copper, tungsten, tantalum, and alloys thereof. Suitable negative current collectors 16 can also include multiple layers of material in a cladding arrangement. Suitable layers of material for use in a multiplayer negative current collector include, but are not limited to, titanium, titanium alloys, stainless steel, nickel, copper, tungsten, tantalum and alloys thereof. The negative current collector 16 can be a foil, net, mesh, or plate.

Figure 3:
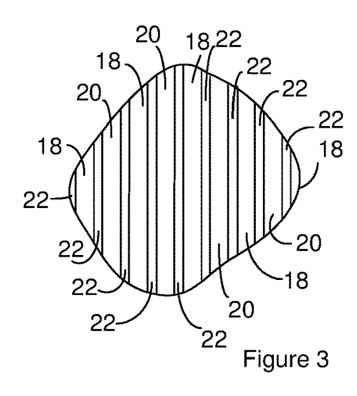
FIG. 3 is a cross section of a portion of an electrode assembly that includes positive electrodes constructed according to FIG. 1A through FIG. 1B and negative electrodes constructed according to FIG. 2A through FIG. 2B.

An electrode assembly includes one or more of the positive electrodes and one or more of the negative electrodes arranged in a stack or rolled together in a jellyroll configuration. When the electrode assembly includes multiple positive electrodes and multiple negative electrodes, the positive electrodes are alternated with negative electrodes. A separator is positioned between positive electrodes and negative electrodes that are adjacent to one another in the electrode assembly. For instance, FIG. 3 is a cross section of a portion of an electrode assembly. The electrode assembly includes positive electrodes 18 alternated with negative electrodes 20 and separators 22 positioned between the positive electrodes 18 and the negative electrodes 20 that are adjacent to each other.

Suitable separators for use in the electrode assembly include, but are not limited to, traditional separators such as polyolefins like polyethylene and polypropylene.

Figure 4:
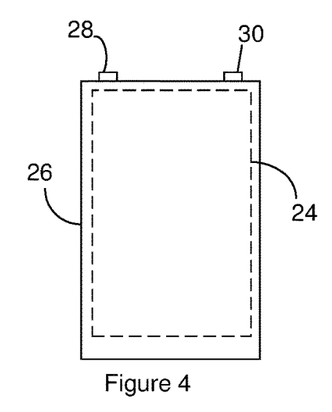
FIG. 4 illustrates a battery including an electrode assembly constructed according to FIG. 3.

A battery can include the electrode assembly 24 positioned in a case 26 as shown in FIG. 4. Although not illustrated in FIG. 4, the one or more positive electrodes in the electrode assembly can be in electrical communication with a first terminal 28 and the one or more positive electrodes in the electrode assembly can be in electrical communication with a second terminal 30. The battery can optionally include one or more insulators (not shown) positioned so as to prevent shorting in the battery.

The case can contain an electrolyte (not shown) that is positioned so as to activate the electrode assembly. For instance, the electrolyte can be positioned between the positive electrodes and the negative electrodes. Suitable electrolytes include, but are not limited to, liquid electrolytes, solid electrolytes, and gel electrolytes. Examples electrolytes include one or more salts dissolved in a solvent. Suitable solvents include, but are not limited to, organic solvents and combinations of organic solvents. Examples of suitable organic solvents include, but are not limited to, cyclic carbonates such as propylene carbonate (PC), ethylene carbonate (EC), butylene carbonate (BC) and vinylene carbonate (VC), linear carbonates such as dimethyl carbonate (DMC), diethyl carbonate (DEC), ethylmethyl carbonate (EMC) and dipropyl carbonate (DPC), dialkyl carbonates such as diglyme, trigylme, tetragylme, 1,2-dimethoxyethane (DME), methyl propyl carbonate, ethyl propyl carbonate, aliphatic carboxylate esters such as methyl formate, methyl acetate and ethyl propionate, gamma.-lactones such as .gamma.-butyrolactone, linear ethers such as 1,2-ethoxyethane (DEE) and ethoxymethoxyethane (EME), cyclic ethers such as tetrahydrofuran and 2-methyltetrahydrofuran, and aprotic organic solvents such as dimethylsulfoxide, 1,3-dioxolane, formamide, acetamide, dimethylformamide, dioxolane, acetonitrile, propylnitrile, nitromethane, ethylmonoglyme, triester phosphate, timethoxymethane, dioxolane-derivatives, sulphorane, methylsulphorane, 1,3-diemthyl-2-imidazoline, 3-methyl-2-oxazolidinone, propylene carbonate-derivatives, tetrahydrofuran-derivatives, ethylether, 1,3-propanesultone, anisole, N-methylpyrrolidone and fluorinated carboxylate esters.

Suitable salts for use with the electrolyte include, but are not limited to, alkali metal salts including lithium salts. Examples of lithium salts include $LiClO_4$, $LiBF_4$, $LiAsF_6$, $LiPF_6$, $LiSbF_6$, $LiCF_3SO_3$, $LiC_6F_5SO_3$, $LiC_4F_9CO_2$, $LiC(CF_3SO_2)_3$, $LiN(SO_2C_2F_5)_2$, $LiN(SO_2CF_3)_2$, $LiAlCl_4$, $LiGaCl_4$, LiSCN, $LiO_2$, $LiO_3SCF_3$, $LiO_2CCF_3$, $LiSO_6F$, $LiB(C_6H_5)_4$, $LiB_{10}Cl_{10}$, lithium lower aliphatic carboxylate, chloroboran lithium, lithium tetraphenylborate, LiBr, LiI, LiSCN, LiCl, imides, Li-methide, Li-imide, lithium alkyl fluorophosphates and mixtures thereof.

Figure 5:
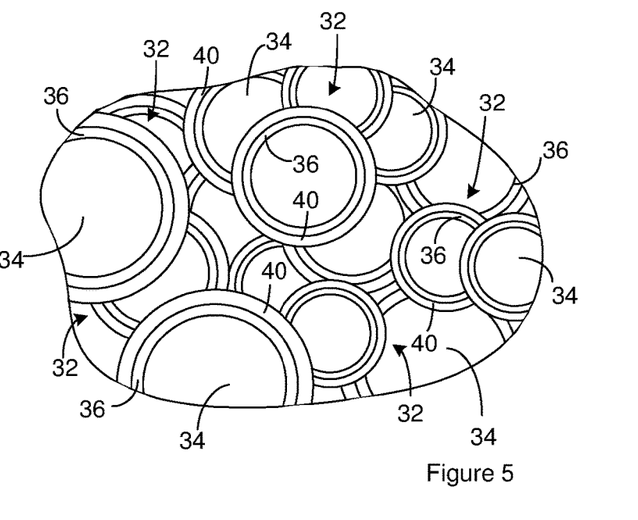
FIG. 5 is a sideview of a portion of a negative electrode that includes active particles. The active particles each includes a core within an shell. The core includes one or more negative active materials.

FIG. 5 is an expanded view of the negative active medium. The negative active medium includes, consists of, or consists essentially of active particles 32. The active particles 32 can adhere to one another. Alternately, the negative active medium can include a binder that binds the active particles 32 together. Suitable binders for use with the active particles 32 include, but are not limited to, PVDF, SBR/CMC, and polyimide. In some instances, the active medium also optionally includes conductive fillers such as carbon black, carbon nanotubes, and/or activated carbon.

The active particles 32 each include a core 34 within a shell 36. The core 34 includes, consists of, or consists essentially of the one or more negative active materials and a reduced cation that is discussed in more detail below. Suitable negative active materials include, but are not limited to, metallic silicon, Al, Sn, In, Mg, Ge, Pb, P, As, Sb, Bi, and their alloys. In some instances, one or all of the negative active materials are metals capable of forming alloys with lithium where the lowest redox potential (vs. Li+/Li) over the range of lithiation that occurs during the operation of the battery is less than 1V (vs. Li+/Li).). Examples of active materials that can satisfy this condition include, but are not limited to, Si, Sn, and In. In some instances, the core 34 includes materials in addition to the one or more active materials and the reduced cation. For instance, the core 34 can include conductive fillers such as, carbon blacks, activated carbon, single-wall carbon nanotubes, multi-wall carbon nanotubes, graphenes, exfoliated graphite, and carbon fibers in addition to the one or more active materials.

The shell 36 is configured to prevent physical contact between the electrolyte and the negative active medium. For instance, the shell 36 can be impermeable to the electrolyte or substantially impermeable to the electrolyte. In one example, the shell 36 limits electrolyte diffusion to less than 1 $\mu L/cm^2$/day. Accordingly, the shell 36 preferably provides more than 90%, 95% or 99% coverage of the surface of the core 34 and/or preferably has a porosity less than 20 $m^2$/g, 10 $m^2$/g, or 5 $m^2$/g. In some instances, the thickness of the shell 36 is greater than 1 nm, 10 nm, or 50 nm and/or less than 1 $\mu$m, 5 $\mu$m or 10 $\mu$m. The shell 36 is ionically conductive and, in some instances, electrically conductive. For instance, the shell thickness can be reduced to a degree that electrical conductivity of the shell is not necessary. As a result, cations such as lithium ions can be conducted through the shell 36 during charging and discharging of the battery.

Suitable shells 36 include, but are not limited to, barriers that include, consist of, or consist essentially of carbons such as amorphous carbon, soft carbon, hard carbon, and/or graphite. Other suitable shells 36 include, but are not limited to, barriers that include, consist of, or consist essentially of polymer electrolytes such as polyethylene glycohol based linear or branched polymers and solid electrolytes such as LISION type solid electrolytes (a family of solid electrolytes with the chemical formula $Li_{2+2x}Zn_{1-x}GeO_4$.), cubic Garnet type solid electrolytes such as $Li_7La_3Zr_2O_{12}$ (LLZO), or other metal oxide type solid electrolytes. Other suitable shells 36 include, but are not limited to, barriers that include, consist of, or consist essentially of a mixture of polymer electrolyte with conductive fillers. The conductive fillers generally do not act as active materials during the operation of the battery. Example conductive fillers include, but are not limited to, activated carbon, carbon black, carbon fiber, carbon nanotubes, graphenes, exfoliated graphite, single-wall carbon nanotubes, multi-wall carbon nanotubes. Other suitable shells 36 include, but are not limited to, barriers that include, consist of, or consist essentially of a mixture of solid electrolyte with conductive fillers such as activated carbon, carbon black, carbon fiber, carbon nanotubes, graphenes, exfoliated graphite. When the shell 36 includes a conductive filler, the conductive filler can be more than 0 wt %, 1 wt %, 5 wt % and/or less than 5 wt %, 10 wt %, or 20 wt % of the weight of the shell 36.

A Solid Electrolyte Interface (SEI) 40 can form on the active particle 32. For instance, the Solid Electrolyte Interface (SEI) 40 can form on the shell 36. The thickness of the Solid Electrolyte Interface (SEI) 40 can change during the operation of the battery. For instance, at the time of battery fabrication and/or before the initial charge of the battery, the Solid Electrolyte Interface 40 may not be present on the active particle 32, however, the Solid Electrolyte Interface (SEI) 40 generally forms during the initial charging of the battery or by immersing in electrolyte if SOC is higher than 0%. Additional formation can occur during subsequent operation of the battery.

The active particles 32 can have a broad range of three-dimensional shapes. For instance, although all of the active particles 32 are shown as spherical or substantially spherical, all or a portion of the active particles 32 can be cubic, cylindrical, conical, spherical, pyramidal and/or semi-spherical. In some instances, the active particles 32 preferably have a diameter or major axis that is greater than 0.1 $\mu$m, or 1 $\mu$m and/or less than 50 $\mu$m or 100 $\mu$m where the diameter or major axis is measured between locations on the outside of the shell 36. Although FIG. 5 shows the active particles 32 as having different dimensions, the active particles 32 can be fabricated to have the same or substantially the same dimensions.

Figure 6:
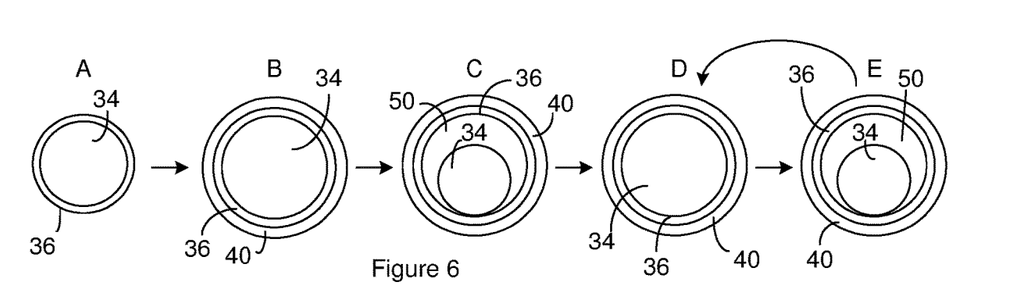
FIG. 6 illustrates the mechanism of operation of an active particle during operation of the battery.

FIG. 6 illustrates the mechanism of operation of an active particle during operation of a secondary battery that includes the active particle in a negative active medium. The battery is fabricated and is then charged before being discharged. After the initial charge and discharge, the battery is cycled between charging phases and discharging phases. The active particle in the diagram labeled A represents the state of the active particle after fabrication of the battery and before the initial charge of the battery. As a result, the battery that includes the active particles in the diagram labeled A is at a State Of Charge (SOC) of less than 100% and the illustrated active particle is at an Active Material State of Charge (AMSOC, discussed in more detail below) of less than 100% or in some instances 100% if non-lithiated material is used as the positive active material. In some instances, the active particles are fabricated such that the core 34 is in direct physical contact with the shell 36 for more than 80%, 90%, or 95% of the surface of the core 34 before the initial charge of the battery.

The diagram labeled B in FIG. 6 shows the state of the active particle after the initial charge of the battery. If the positive active material is non-lithiated, the initial charging step can be skipped. When an initial charge is performed, the initial charge forms all or a portion of the Solid Electrolyte Interface (SEI) 40 on the active particle. During the initial charge of the battery, a component of the positive active medium is oxidized into a cation that enters the electrolyte and migrates to the negative electrode. The component that is oxidized can be an element or compound. For instance, when the one or more positive active materials include lithium nickel cobalt aluminum oxide (NCA), charging the battery causes the lithium in the NCA to be oxidized into lithium cations ($Li^+$) which enter the electrolyte and migrate to a negative electrode. At the negative electrode, the cations enter the active particle by crossing the shell 36 and intercalating into and/or forming an alloy with the core 34 where it is reduced so as to provide a reduced cation. The cations can react with the negative active materials. For instance, when the cations are lithium cations and the one or more negative active materials include silicon, the cations can react with the silicon to produce one or more forms of lithiated silicon of lithium silicide ($Li_xSi$). Accordingly, the reduced cation can be an element in the core 34 or can be included in a chemical compound in the core 34.

The addition of the cations into the cores 34 increases the volumes of the cores 34 and accordingly of the active particle. Accordingly, the volume of the active particle in the diagram labeled B is larger than the volume of the active particle in the diagram labeled A.

During the initial charge of the battery, the State Of Charge (SOC) of the battery can be increased by more than 90%, 50%, or 10% and/or to greater than 80%, 90% or 100% and/or the Active Material State Of Charge (AMSOC) can be increased by more than 90%, 50%, or 10% and/or to greater than 80%, 90% or 100%. Additionally, the active particles are fabricated such that the core 34 is in direct physical contact with the shell 36 for more than 80%, 90%, or 95% of the surface of the core 34 after the initial charge of the battery.

The diagram labeled C in FIG. 6 shows the state of the active particle after the initial discharge of the battery. The initial discharge of the battery can reduce the State Of Charge (SOC) of the battery by more than 40%, 60% or 100% and/or to less than 60%, 40% or 0% and/or the Active Material State Of Charge (AMSOC) can be reduced by more than 40%, 60%, or 100% and/or to greater than 60%, 40% or 0%.

During the discharge of the battery, the reduced cations in the cores 34 are oxidized back to the cations. The cations depart from the active particle by moving out of the core 34 and then crossing the shell 36. The departure of the cations from the core 34 causes a decrease in volume of the core 34. However, rather than the shell 36 shrinking, the shell 36 maintains its size or substantially maintains its size. For instance, a reduction in the Active Material State of Charge (AMSOC) of more than 100% can cause the active particle to experience a change in volume of less than 300%. Since the shell 36 maintains its size or substantially maintains its size during discharge, the stress applied to the Solid Electrolyte Interface (SEI) 40 is reduced or even eliminated during the discharge. As a result, cracking of the Solid Electrolyte Interface (SEI) 40 is reduced during discharge of the battery.

Since discharge causes the core 34 volume to decrease while the shell 36 substantially maintains its size, the core 34 pulls away from the shell 36 at one or more locations. For instance, in some instances, reducing the state of charge of the battery by more than 20%, can result in a shell 36 that does not contact the core 34 over more than 10%, or 30% of the surface area of the core 34. The cores 34 can maintain contact with the shell 36. When the shells 36 are electrically conductive, the shell 36 continues to provide electrical communication between the cores 34 and the negative current collector.

Since the core 34 pulls away from the shell 36, a secondary space 50 is generated between the shell 36 and the core 34. Without being bound to theory, it is believed that the secondary space 50 is occupied by a gas such as nitrogen, argon or dry air that is partially dissolved in the electrolyte or trapped in the case.

The diagram labeled D in FIG. 6 shows the state of the active particle after a subsequent charge of the battery. During the charging of the battery, cations enter the active particle by crossing the shell 36 and intercalating into and/or forming an alloy with the core 34 and can cause an increase in volume of the core 34 and accordingly of the active particle. The battery can be charged to a State of Charge where the core 34 returns to a state where there is direct physical contact with the shell 36 for more than 80%, 90%, or 95% of the surface of the core 34.

During this charge of the battery, the State Of Charge (SOC) of the battery can be increased by more than 20%, 60%, or 100% and/or to greater than 80%, 90% or 100% and/or the Active Material State Of Charge (AMSOC) can be increased by more than 20%, 60%, or 100% and/or to greater than 80%, 90% or 100%. In some instances, the battery can be charged to the same, or substantially the same, State Of Charge (SOC) reached in the initial charge. Alternately, the battery can be charged above the State Of Charge (SOC) reached in the initial charge. Accordingly, the charging of the battery can return the structure of the active particle in the diagram labeled D to the same or substantially the structure as the active particle in the diagram labeled B. In some instances, the Solid Electrolyte Interface (SEI) 40 on the active particle in the diagram labeled D is thicker than the Solid Electrolyte Interface (SEI) 40 on the active particle in the diagram labeled B.

The diagram labeled E in FIG. 6 shows the state of the active particle after a subsequent discharge of the battery. During the discharging of the battery, cations depart from the active particle by moving out of the core 34 and then crossing the shell 36. The departure of the cations from the core 34 causes a decrease in volume of the core 34. Since discharge causes the core 34 volume to decrease while the shell 36 maintains its size, the core 34 pulls away from the shell 36 at one or more locations. The shell 36 continues to maintain its size or substantially maintains its size. For instance, a reduction in the state of charge of the battery of more than 100% can cause the active particle to experience a change in volume of less than 300%.

This discharge of the battery can reduce the State Of Charge (SOC) of the battery by more than 40%, 60% or 100% and/or to less than 60%, 40% or 0% and/or the Active Material State Of Charge (AMSOC) can be increased by more than 40%, 60%, or 100% and/or to less than 60%, 40% or 0%. In some instances, the battery can be discharged to the same, or substantially the same, State Of Charge (SOC) reached in the initial discharge of the battery. Alternately, the battery can be discharged to below the State Of Charge (SOC) reached in the initial discharge. Accordingly, the discharging of the battery can return the structure of the active particle in the diagram labeled E to the same or substantially the structure as the active particle in the diagram labeled C.

The arrow labeled W in FIG. 6 illustrates the condition of the active particle during subsequent cycling of the battery. For instance, subsequent cycling of the battery can cause the active particle to alternate between the state shown in diagram D (upon charge) and the state shown in diagram E (upon discharge). In some instances, additional cycling of the battery increases the thickness of the Solid Electrolyte Interface (SEI) 40 before the thickness stabilizes and/or becomes constant or substantially constant.

During charge of the battery, cations migrate through the electrolyte and are reduced at the negative electrode. In prior batteries, the active particle of diagram A excludes the reduced cations before the initial charge of the battery. However, it has been found that under these conditions, that the secondary space 50 between the shell 36 and the core 34 must be precisely controlled in order to prevent the core 34 from rupturing the shell 36 when charging the battery. This need for precise control has prevented commercial adoption of this technology. The Applicant has found that this rupturing can be reduced or eliminated by introducing the reduced cation into the core 34 before the initial charge of the battery.

The amount of the reduced cation introduced into the core 34 before the initial charge of the battery can be characterized by an active material state of charge (AMSOC). For example, the core 34 can include silicon as a negative active material and the cations can be lithium cations (Li$^+$). In this example, charging the battery causes the silicon to become lithiated. The lithiated silicon (lithium silicide) can generally be represented by Li$_x$Si where x is from 0.44 to 8.8. The lithiated silicon can exist in several forms such as Li$_2$Si, Li$_{21}$Si$_8$, Li$_5$Si$_4$, and Li$_{22}$Si$_5$. In practice, the highest level of silicon lithiation achieved in batteries occurs when the lithiated silicon takes the form of Li$_{22}$Si$_5$. Accordingly, a 100% AMSOC corresponds to Li$_{22}$Si$_5$ and 0% AMSOC corresponds to Si. The amount of reduced cation introduced into the core 34 can be selected such that the volume of the core 34 before the initial charge of the battery is less than 90%, or 50% of the volume of the core 34 after one or more stages selected from the group consisting of the maximum volume of the core 34 during initial charge of the battery, the volume of the core 34 at 100% AMSOC, and the volume of the core 34 when the battery is at 100% SOC and/or more than 10%, or 50% of the volume of the core 34 after one or more stages selected from the group consisting of the volume of the core 34 at 0% AMSOC, and the volume of the core 34 when the battery is at 0.0% SOC. The amount of reduced cation introduced into the core 34 before the initial charge of the battery can be sufficient to provide a AMSOC greater than 20%, or 50% and/or less than 100%. In theory, the levels of lithiation higher than Li$_{22}$Si$_5$ are possible. As a result, AMSOC levels higher than 100% are possible.

The introduction of the reduced cation into the core 34 before the initial charge of the battery also permits the use of irreversible active materials in the cores 34. Many of these materials have desirable cycling performance. SiO (silicon oxide) is an example of a negative active material that is associated with excellent cycling performance. However, SiO is generally not used in a large amount as an active material in the battery due to having a high level of irreversibility, especially during the first charge/discharge cycle. The reduced ion that is present in to the core 34 before the initial charge of the battery can balance out the irreversible capacity of the SiO. As a result, the battery can have the benefits of the cycling performance of the highly irreversible active material and increased energy density associated with the reversible active materials.

Suitable irreversible active materials for use in the cores 34 have irreversibility less than 50%, 40%, or 30% such as SiO, silicon nanoparticle with oxidated surface, silicon nanoparticles embedded in SiO$_2$. Examples of irreversible active materials that can be included in the core 34 can be represented as, but are not limited to, SiO$_x$, where x is greater than 0 and less than 2. When the core 34 includes irreversible active materials, the irreversible materials can be more than 60 wt %, 70 wt %, or 80 wt %, and/or less than 99 wt %, or 90 wt % of the total weight of the active materials included in the core 34.

Figure 7A:
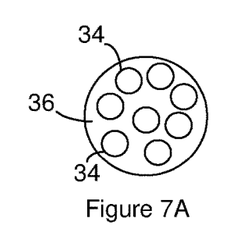
FIG. 7A is a cross section of an active particle that includes multiple cores within a single shell.

Although FIG. 5 and FIG. 6 show a single core 34 located with the shell 36, an active particle can include two or more cores 34 within a shell 36. For instance, FIG. 7A is a cross section of an active particle that includes multiple cores 34 within a single shell 36. In these instances, the shell 36 preferably provides more than 90%, 95% or 99% and up to 100% coverage of each of the cores 34 and/or preferably has porosity less than 20 m$^2$/g, 10 m$^2$/g, or 5 m$^2$/g. In some instances, the shell 36 is constructed such that a minimum distance from an outer surface of the shell 36 to a surface of any of the cores 34 is greater than at least 1 nm, 10 nm, or 50 nm and/or less than 1 μm, or 10 μm.

Figure 7B:
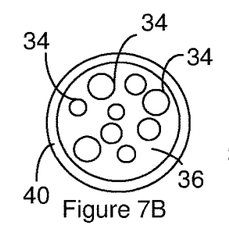
FIG. 7B shows a Solid Electrolyte Interface (SEI) on the active particle of FIG. 7A.
Figure 7C:
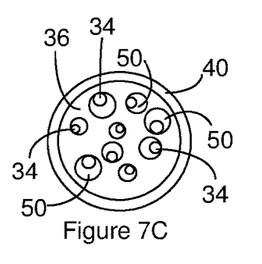
FIG. 7C shows the cores in the active particle of FIG. 7A pulled away from the shell.

As shown in FIG. 7B, the Solid Electrolyte Interface (SEI) 40 forms on the outer surface of the active particle during the operation of the battery. As shown in FIG. 7C, discharge of the battery causes the core 34 volumes to decrease while the shell 36 maintains its size. As a result, the cores 34 pull away from the shell 36 at one or more locations.

Figure 8A:
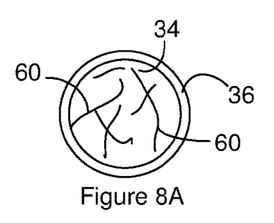
FIG. 8A is a cross section of an active particle having a core that includes one or more electrically conductive fillers.
Figure 8B:
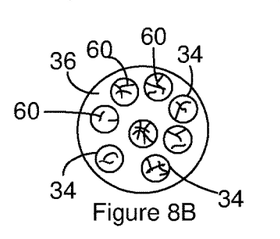
FIG. 8B illustrates an active particle constructed according to FIG. 7A where the cores each include one or more electrically conductive fillers.

In some instances, the one or more cores 34 include one or more electrically conductive fillers. The conductive fillers generally do not act as active materials during the operation of the battery. The conductive fillers can increase the electrical conductivity and enhance the power capability of the battery made with the material. FIG. 8A is a cross section of an active particle having a core 34 that includes one or more electrically conductive fillers 60. FIG. 8B illustrates an active particle constructed according to FIG. 7A where the cores 34 each include one or more electrically conductive fillers 60. Examples of suitable electrically conductive fillers include, but are not limited to, activated carbon, carbon black, carbon fiber, carbon nanotubes, graphenes, and exfoliated graphite. In some instances, the amount of conductive filler is greater than 0 wt %, 5 wt %, or 10 wt % and/or less than 20 wt %, 30 wt %, or 50 wt % of the weight of the active particle before the initial charge of the active particle.

Cores that include the reduced cations can be fabricated by a number of different approaches. For instance, reduced cation that is molten can be mixed with the one or more negative active materials that will be included in the core 34 and any electrically conductive filler at a temperature above the melting point of the reduced cation. As an example, molten lithium can be mixed with silicon at temperature above the melting point of lithium. The result can be cooled grounded and sieved so as to collect cores 34 with the size that is desired for the cores 34 before the initial charge of the battery. Lithiated metals are in general very reactive and react with moisture. As a result, they may need to be handled in an inert atmosphere such as argon.

The shell 36 can be formed on the surface using deposition techniques such as Chemical Vapor Deposition (CVD), Physical Vapor Deposition (PVD) and Atomic Layer Deposition (ALD). Alternately, the shell 36 can be formed by mixing the cores 34 with carbon precursors such as coal tar pitch, petroleum pitch, polyacrylonitrile, polystyrene, polyvinilidenfluoride, and sugar with or without a solvent. The mixture can be heated at an elevated temperature to convert the precursor to carbon. The temperature should be lower than temperature at which the one or more negative active materials in the core and the carbon reacts. When the negative active material is silicon, the temperature can be less than 1,100° C.

Example 1

Negative electrodes were fabricated for use in comparative batteries. Cores were fabricated by mixing molten lithium with silicon at 810° C. The result was cooled grounded and sieved so as to collect cores less than 50 μm. Shells were formed on the cores by mixing the cored with coal tar pitch dissolved in quinolone (1 wt % solution), removing quinolone under vacuum, and by carbonizing the coal tar pitch at 600° C. under argon for 6 h.

First negative electrodes were formed by mixing the resulting active particles (29% wt %), graphite (67 wt %) and PVDF binder (4 wt %) in NMP. The slurry was cast on copper foil using a doctor blade and dried initially at 90° C. under Argon and in vacuum at 110° C.

Second negative electrodes were formed by mixing the resulting active particles (8% wt %), SiO (wt 38%), graphite (wt 48%) and carbon nanofiber (wt 2%) and PVDF binder (4 wt %) in NMP. The slurry was cast on copper foil using a doctor blade and dried initially at dry air at 90° C. and in vacuum at 110° C.

Example 2

Multiple Comparative batteries were formed.

A first battery was fabricated with an aluminum positive current collector, a positive active medium that included 84 wt % NCA and 8 wt % carbon black. The first battery also included a copper negative current collector, a negative active medium that included 67 wt % graphite and 29 wt % carbon nanofiber.

A second battery was fabricated with an aluminum positive current collector, a positive active medium that included 94 wt % NCA and 2 wt % carbon black. The second battery also included a copper negative current collector, a negative active medium that included 67 wt % graphite and 29 wt % carbon nanofiber.

A third battery was fabricated with an aluminum positive current collector, a positive active medium that included 94 wt % NCA and 2 wt % carbon black. The third battery also included a, a copper negative current collector, a negative active medium that included 67 wt % graphite and 29 wt % silicon.

A fourth battery was fabricated with a first negative electrode constructed according to example 1, an aluminum positive current collector, a positive active medium that included 94 wt % $V_2O_5$ and 2 wt % carbon black.

A fifth battery was fabricated with a first negative electrode constructed according to example 1, an aluminum positive current collector, a positive active medium that included 94 wt % $FeSe_2$ and 2 wt % carbon black.

A sixth battery was fabricated with a first negative electrode constructed according to example 1, an aluminum positive current collector, a positive active medium that included 94 wt % FeS2, and 2 wt % carbon black.

A seventh battery was fabricated with a first negative electrode constructed according to example 1, an aluminum positive current collector, a positive active medium that included 94 wt % $CoS_2$ and 2 wt % carbon black.

An eighth battery was fabricated with a first negative electrode constructed according to example 1, an aluminum positive current collector, a positive active medium that included 76 wt % sulfur and 20 wt % carbon black.

A ninth battery was fabricated with a second negative electrode constructed according to example 1, an aluminum positive current collector, a positive active medium that included 94 wt % NCA and 2 wt % carbon black.

The comparative batteries were measured for energy density by charging at 4.1V for the first, second, third battery and ninth battery, 3.6V for the forth battery, 2.8V for the fifth battery, 2.4V for the sixth battery, 3.0V for the seventh battery, 2.7V for the eighth battery, and by discharging at 2.7V for the first, second, third battery and ninth battery, 1.2V for the forth battery, 1.4V for the fifth battery, 1.0V for the sixth battery, 1.0V for the seventh battery, 1.0V for the eighth battery at room temperature. The results are presented in FIG. 9. While the fifth battery, sixth battery, and seventh battery used the active particles disclosed above, they showed lower energy densities because of the lower voltage positive active materials. The highest energy density was achieved when the active particles were combined with the higher voltage and/or high capacity positive active materials used in the eighth battery and the ninth battery.

Example 3

The cycle performance of the comparative batteries was estimated using internal data and values from the literature. The internal data was generated by repeating the above energy determination cycle at room temperature.

The estimated cycle performances were assigned a cycle score based on the results. A cycle score of 5 was assigned when the battery showed more than 90% capacity retention at 1000 cycles. A cycle score of 4 was assigned when the battery showed more than 50% and less than 90% of capacity retention at 1000 cycles. A cycle score of 3 was assigned when the battery less than 50% capacity retention at 1000 cycles and more than 50% capacity retention at 500 cycles. A cycle score of 2 was assigned when the battery less than 50% capacity retention at 500 cycles and more than 50% capacity retention at 100 cycles. A cycle score of 2 was assigned when the battery less than 50% capacity retention at 100 cycles and more than 50% capacity retention at 50 cycles.

Figure 9:
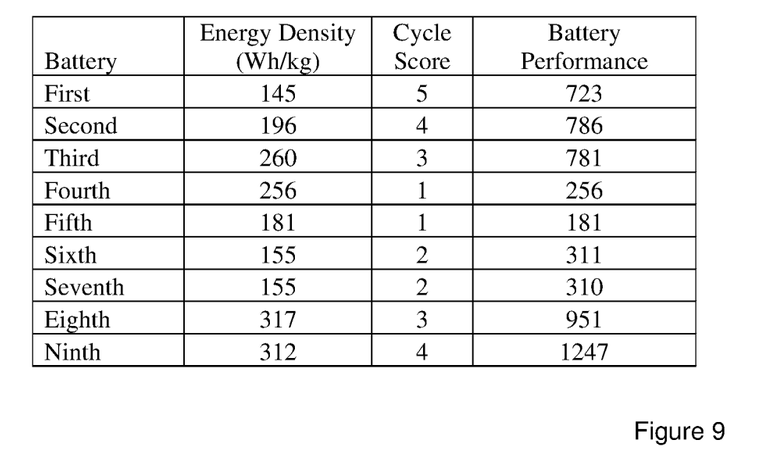
FIG. 9 is a table comparing data developed for multiple different comparative batteries.

The cycle score results are shown in FIG. 9. The first battery and the second battery have highs cores because these chemistries are selected to produce high levels of cycling performance. The eight and ninth batteries also provided high cycling performance. However, the ninth battery provided better cycling performance due to the presence of the SiO in the negative active medium. The SiO is known for better cycle performance relative to silicon because of nano size silicon particles embedded within the SiOx matrix.

Example 4

In order to evaluate the performances of the comparative cells both in terms of cycle and energy density, the energy density was multiplied by the cycle score to generate a battery performance score. The battery performance scores are shown in FIG. 9. The high energy densities associated with the eighth battery and the ninth battery provides these batteries with the highest battery performance scores.

Although FIG. 6 illustrates the mechanism of a single active particle in the negative medium of a negative electrode, the illustrated mechanism can apply to multiple, a portion of, substantially all of, or all of the active particles in the negative medium. Additionally, although FIG. 6 illustrates the mechanism for an active particle that includes a single core enclosed within a shell, the mechanism also applies to active particles that each includes multiple cores within a shell.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A battery, comprising:
   an electrode having a layer of an active medium that includes multiple active particles,
   each active particle including a shell that encloses one or more cores,
   the shell including a solid electrolyte, and
   each core including one or more active materials; and
   the battery having a State of Charge (SOC) that is greater than 0% before an initial operation of the battery, and
   the one or more cores pull away from the shell in response to discharge of the battery.

2. The battery of claim 1, wherein the battery is a secondary battery.

3. The battery of claim 1, wherein the one or more active materials is silicon.

4. The battery of claim 1, further comprising:
Solid Electrolyte Interfaces (SEI) positioned on the active particles.

5. The battery of claim 1, wherein more than 50% of a surface of the one or more active materials is in direct physical contact with the shell before the initial charge of the battery.

6. The battery of claim 1, wherein at least a portion of the active particles have a core with a volume before the initial charge of the battery that is less than 90% of the volume of the core at a 100% state of charge.

7. The battery of claim 1, wherein the portion of the active particles have a core with a volume before the initial charge of the battery that is more than 110% of the volume of the core at a 0% state of charge.

8. The battery of claim 1, wherein the battery is configured such that a cation travels between a positive electrode and a negative electrode during operation of the battery and the one or more active materials include a reduced form of the cation before the initial charge of the battery.

9. The battery claim 8, wherein the cation is a lithium cation.

10. The battery of claim 1, further comprising:
an electrolyte and wherein the shell is impermeable to the electrolyte.

11. The battery of claim 10, wherein the shell limits electrolyte diffusion to less than 1 μL/cm2/day.

12. The battery of claim 1, wherein at least one of the one or more negative active materials is capable of forming an alloy with lithium where the lowest redox potential (vs. Li+/Li) over the range of lithiation that occurs during the operation of the battery is less than 1V (vs. Li+/Li).

13. The battery of claim 1, wherein at least a portion of the cores include an electrically conductive filler.

14. The battery of claim 1, wherein at least one of the one or more active materials is $Li_xSi$ where x is from 0.44 to 8.8.

15. The battery of claim 1, wherein the initial operation of the battery is initial charge of the battery.

16. The battery of claim 1, wherein the solid electrolyte is selected from the group consisting of cubic garnet and $Li_{2+2x}Zn_{1-x}GeO_4$.

17. The battery of claim 1, wherein the solid electrolyte includes the cubic garnet.

18. The battery of claim 1, wherein the cubic garnet is represented by $Li_7La_3Zr_2O_{12}$.

19. The battery of claim 1, wherein the shells have a thickness greater than 1 nm and less than 1 μm and a porosity less than 20 m²/g.

20. The battery of claim 1, wherein the active medium includes a binder that binds together the active particles.

* * * * *